United States Patent [19]
Fukuda

[11] Patent Number: 5,904,238
[45] Date of Patent: May 18, 1999

[54] DUEL BELT CONVEYOR SYSTEM

[75] Inventor: Masao Fukuda, Narashino, Japan

[73] Assignee: Kabushiki Kaisha Iseki Kaihatsu Koki, Tokyo, Japan

[21] Appl. No.: 08/900,831

[22] Filed: Jul. 25, 1997

[30]    Foreign Application Priority Data

| Aug. 8, 1996 | [JP] | Japan | 8-209539 |
| Aug. 8, 1996 | [JP] | Japan | 8-209541 |

[51] Int. Cl.⁶ .................................................. B65G 15/14
[52] U.S. Cl. ................................... 198/626.5; 198/626.3
[58] Field of Search ................................ 198/604, 606, 198/607, 620, 626.1, 626.3, 626.5

[56]           References Cited

U.S. PATENT DOCUMENTS

| 1,486,950 | 3/1924 | Curtis | 198/626.5 |
| 5,186,310 | 2/1993 | Winchester | 198/626.5 |
| 5,435,433 | 7/1995 | Jordan et al. | 198/626.5 |

FOREIGN PATENT DOCUMENTS

| 4-354708 | 12/1992 | Japan | 198/626.3 |
| 876509 | 11/1981 | U.S.S.R. | 198/607 |

*Primary Examiner*—James R. Bidwell
*Attorney, Agent, or Firm*—Townsend & Banta

[57]           ABSTRACT

A dual belt conveyor having a pair of long plates provided with a plurality of edge rollers brought into contact with both lateral belt edges. The long plates are arranged against both lateral belt edges of two superimposed conveyor belts, along the direction of belt travel in the vertical part, so that both long plates are opposite each other. Two link plates are rotatably attached to the long plates on one side of each link plate, and connected with each other through a central pin on the other side of each link plate. A pair of the long plates are engaged with each other through the two link plates in at least three points. The central pins are rotatably attached to an apparatus frame in at least two points. An adjusting member provided on the apparatus frame is connected with one of the central pins at the remaining point.

5 Claims, 11 Drawing Sheets

F I G. 1
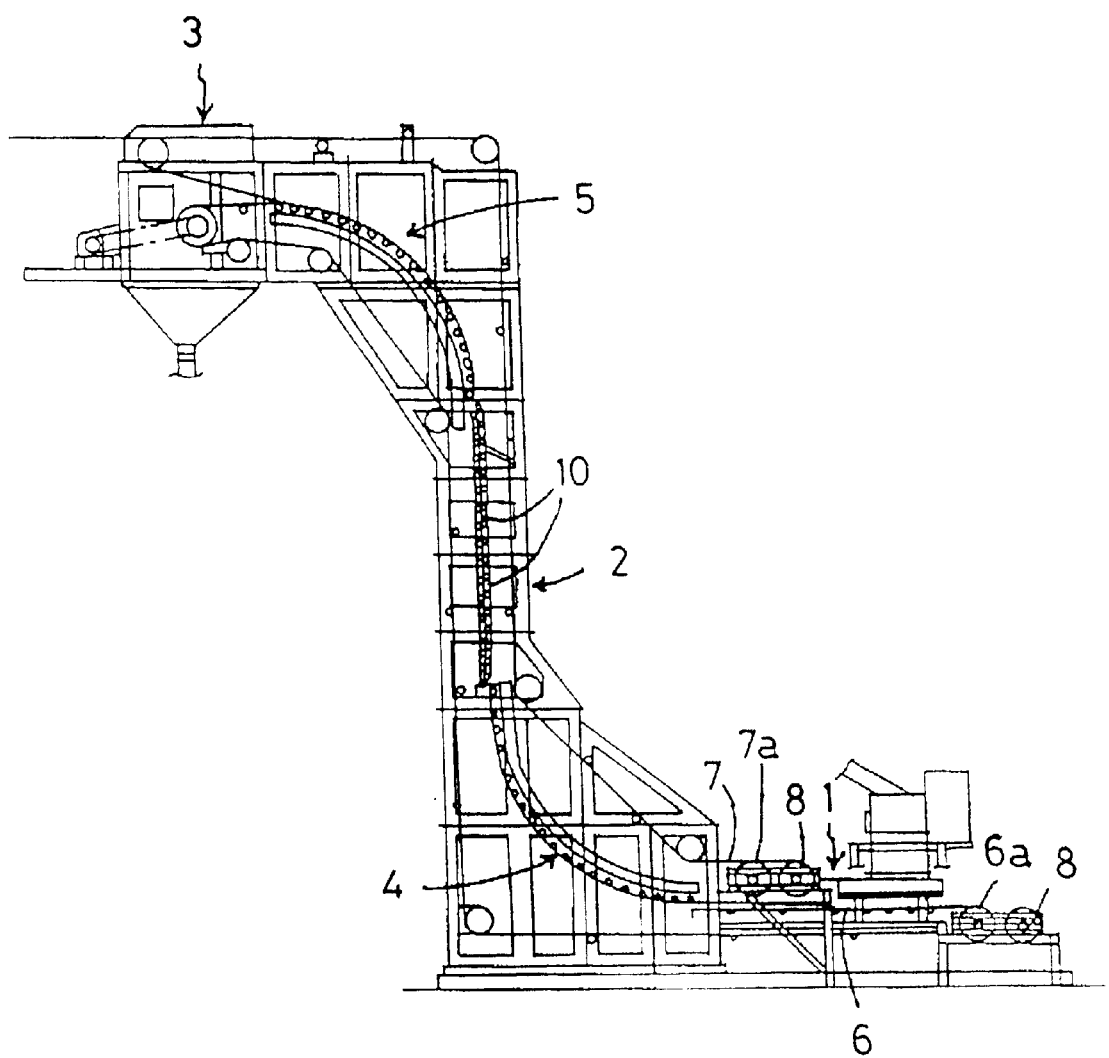

(a)

(b)

F I G. 4
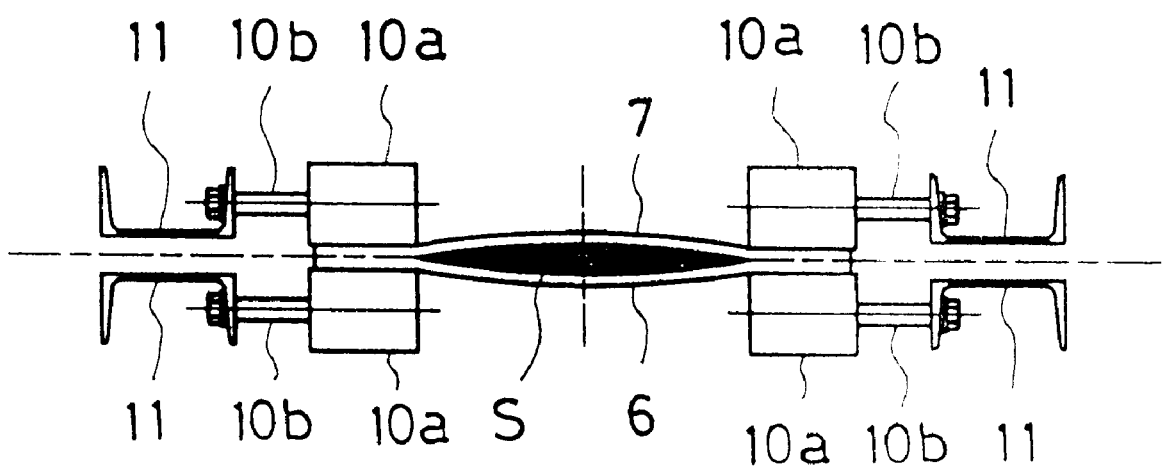

F I G. 5
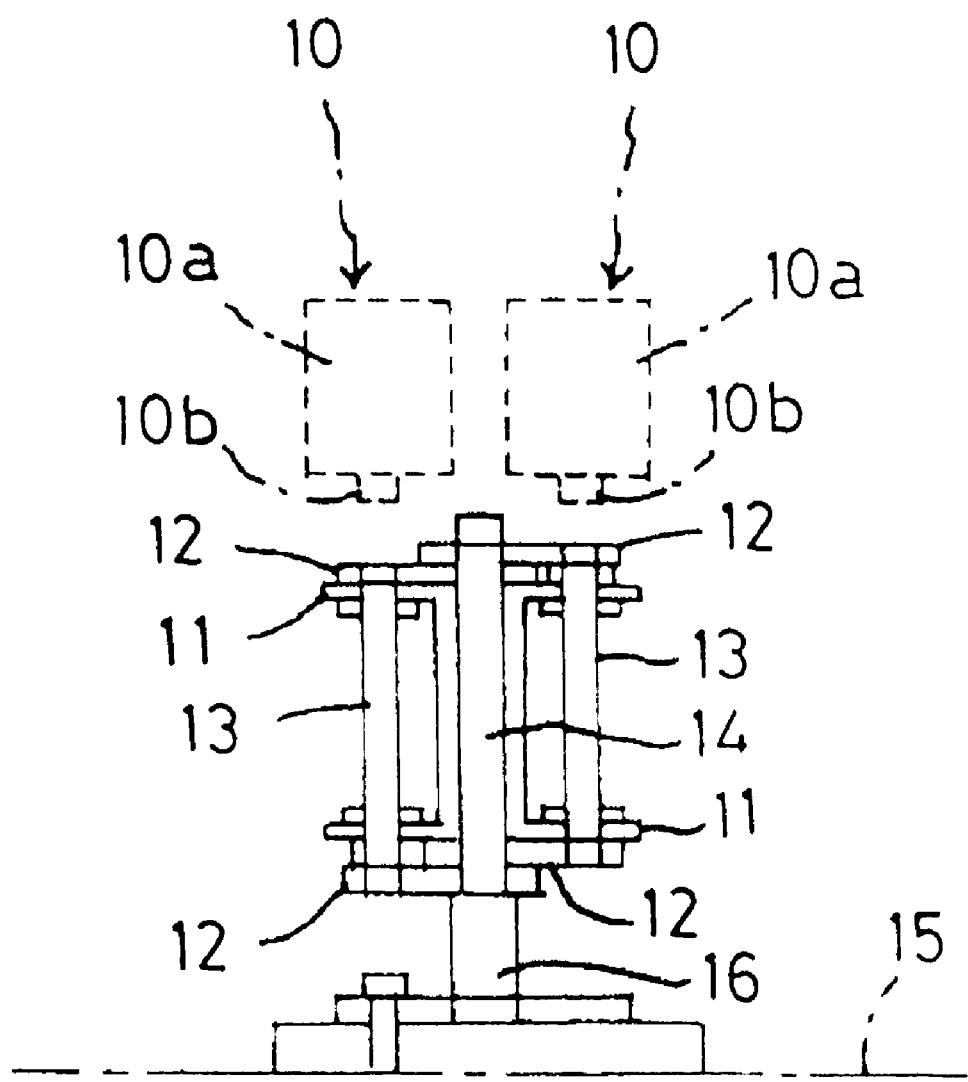

(a)

(b)

(c)

F I G. 9
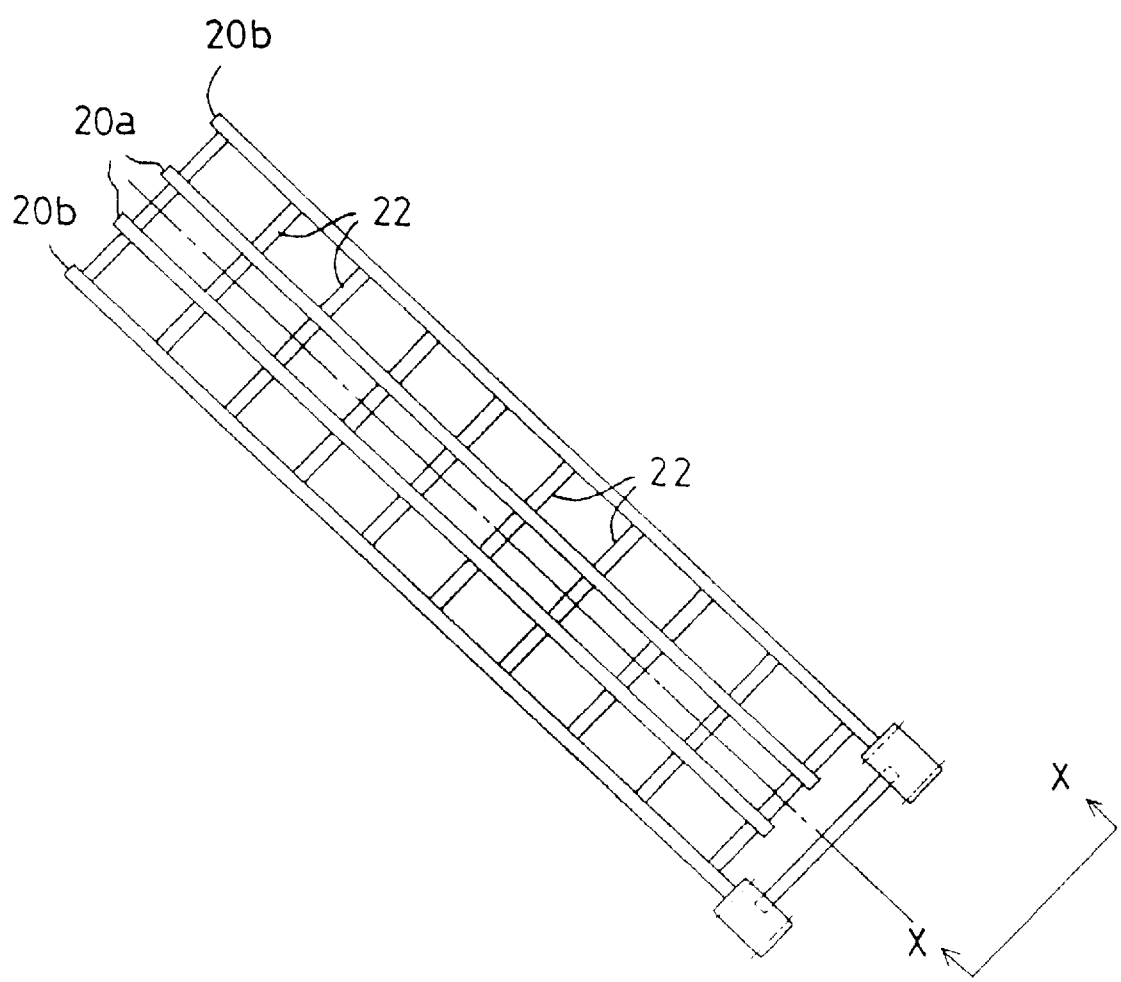

(a)

(b)

DUEL BELT CONVEYOR SYSTEM

BACKGROUND OF THE INVENTION (1). Field of the Invention

This invention relates to a dual or sandwich belt conveyor system in which material to be conveyed, which is placed between two superimposed conveyor belts, is conveyed in the direction of from the lower part to the upper part of the conveyor system, or in the reverse direction, and particularly a dual belt conveyor system in which work for adjusting edge rollers brought into contact with belt edges of two superimposed conveyor belts can be made easily, and maintenance efficiency of rollers disposed in a looped part of the dual belt conveyor system can be improved.

(2). Description of the Prior Art

A dual belt conveyor system is known in which material to be conveyed, for example, massive material such as ore and limestone, granular material typified by beans, and powdery material such as sugar and flour, and other material with various properties, is conveyed in the vertical direction by being placed between two superimposed conveyor belts. In this dual belt conveyor system, higher tensile force, as compared with an ordinary conveyor system, is applied to two superimposed conveyor belts so that material to be conveyed can be carried between two superimposed conveyor belts by exerting a force on the conveyor belts which tends to force each belt into contact with the other.

Carrier rollers are arranged in horizontal conveying parts disposed at the upper part and at the lower part of the conveyor system, respectively, and looped conveying parts are connected to the respective horizontal conveying parts with a vertical conveying part so that one conveyor belt or two superimposed conveyor belts are supported by the carrier rollers. In a different embodiment, a plurality of edge rollers are arranged in a vertical conveying part so that two superimposed conveyor belts are supported by the edge rollers, which are brought into contact with both lateral belt edges of two superimposed conveyor belts.

The above-mentioned edge rollers are staggered against and brought into contact with both lateral belt edges in the vertical conveying part in such a manner that the material-carrying surface areas of two conveyor belts (namely surface areas of two superimposed conveyor belts which confront each other and carry material to be conveyed therein) move in essentially the same straight line. Therefore, with conveyor belts being worn away, edge rollers are apt to leave both lateral belt edges of conveyor belts and sufficient support of conveyor belts, therefore, becomes impossible. In this case, it is necessary to adjust the position of individual edge rollers in such a manner that each roller is brought into contact with the conveyor belts.

However, adjusting individual edge rollers in such a manner that each individual roller is brought into contact with conveyor belts is very time consuming, since the number of the above-mentioned edge rollers abounds in a vertical conveying part (in the case of the height of a vertical part being 15 m, the number of edge rollers is about 240). In order to solve this problem, Japanese utility model laid-open No. 42967 of 93 (Heisei 5) is provided. This art discloses a pair of parallel frames, in which these frames are moved relatively in opposite direction of each other so that adjustment is made in which individual rollers mounted on the frames are brought into contact with the conveyor belts.

In the above-mentioned art, where new conveyor belts are used, individual edge rollers can be brought into contact with the conveyor belts at nearly equal spaces in the direction of belt travel. However, when conveyor belts are worn away, spaces between edge rollers in the direction of belt travel become varied and the conveyor belts are not supported uniformly at nearly equal spaces. In this case, material to conveyed leaks from the lateral belt edges of the two traveling superimposed conveyor belts.

Further, since the outer surface of used carrier rollers for supporting belts become worn, a change of worn rollers for new rollers is needed. When worn carrier rollers are changed for new rollers, it is first necessary to remove a base plate on which a stand for bearing each individual carrier roller is fixed from an apparatus frame (not shown). This work is carried out by first removing bolts for fixing the base plate and, thereafter, removing the base plate from the apparatus frame with the base plate being laid on the side. However, since this work is difficult, various arts are proposed.

In carrier rollers disclosed, for example, in Japanese utility model laid-open No. 50214 of 1989 (Showa 64), each individual carrier roller is supported on a roller frame which is formed individually, and each individual roller frame is secured to a base frame, so that carrier rollers can be easily exchanged by removing each carrier roller individually. Further, as disclosed in Japanese utility model laid-open No. 145222 of 1990 (Heisei 2), a foundation part is put over the conveyor belts in the lateral direction of the belts, an inner supporting part for supporting the center rollers is secured to the foundation part, and an outer supporting part for supporting the outside of the slide roller is detachably attached to the foundation part.

The above-mentioned arts relate to carrier rollers used for dual belt conveyors in which material such as ore is placed and conveyed on one continuously traveling belt. In the case where the carrier rollers are exchanged, loads which act on carrier rollers are nearly equal to the sum of the weight of the belt portion between adjacent carrier rollers and the weight of the material to be conveyed which is placed on the belt portion, in which burden loads acting on carrier rollers are not so heavy. Accordingly, an exchange of used carrier rollers for new carrier rollers can be easily made by supporting the lower part of the belt by other supporting members.

However, since high tension acts on both belts in a dual belt conveyor, loads according to the tension applied to the belt by the weight of the material to be conveyed act on carrier rollers which are disposed on a circular arc forming a looped conveying part. Therefore, when exchanging carrier rollers, it is necessary to apply a force in the normal direction of the loop forming the looped conveying part to two conveyor belts by means of a chain block. Accordingly, problems arise relating to the strength which is caused by applying partial tension to belt, and a decrease in the working efficiency of exchange of carrier rollers.

Further, even when carrier rollers in accordance with the conventional art are applied to a looped conveying part having the above-mentioned problems, the above-mentioned problems are solved. Namely, since in conventional carrier rollers an axis has two chamfered parts formed on a part of the axis in the longitudinal direction, and the roller stand has on the upper end side thereof a groove with the same length as the above-mentioned two chamfered parts, it is necessary to insert a part of the axis with the two chamfered parts into the groove from the upper end of the roller stand, and is, therefore, also necessary to raise the axes to a higher position than the upper end of the roller stand. Therefore, there is the problem that it is also necessary to apply a force in the normal direction of the loop forming the looped conveying part to two conveyor belts by means of, for example, a chain block.

BRIEF SUMMARY OF INVENTION

Accordingly, an object of the present invention is to provide a dual belt conveyor having edge rollers mounted for both lateral belt edges of two superimposed conveyor belts, in which the work time can be reduced for adjusting the edge rollers to enable contact between the edge rollers and the conveyor belts and, even when adjustment of edge rollers is made as the conveyor belts are worn away, spaces between the edge rollers can be maintained.

Another object of the present invention is to provide a dual belt conveyor having edge rollers mounted for both lateral belt edges of two superimposed conveyor belts, in which work time can be reduced for adjusting the edge rollers to enable contact between the edge rollers and the conveyor belts and, even when adjustment of the edge rollers is made as the conveyor belts are worn away, longitudinal spaces between the edge rollers can be maintained, and further efficiency of maintenance of rollers disposed on looped parts, including exchange thereof, is improved.

Further, another object of the present invention is to provide a dual belt conveyor in which efficiency of maintenance of rollers disposed on looped parts, including exchange thereof, is improved.

To achieve the above-mentioned first object, according to the present invention, in a dual belt conveyor being comprised of a lower horizontal part, a vertical part, and an upper horizontal part, and having two superimposed conveyor belts stretched throughout the individual parts thereof so that material to be conveyed, which is placed between the two superimposed conveyor belts, is conveyed in the vertical direction. The dual belt conveyor further comprises a pair of long plates arranged against both lateral belt edges of two superimposed conveyor belts, along the direction of belt travel in the vertical part, so that both the long plates are opposite each other, and two link plates are rotatably attached to the long plates on one side of each link plate while one link plate and another link plate are connected with each other through a central pin on the other side of each link plate, wherein a pair of the long plates are engaged with each other through the link plates in at least three points, the central pins are rotatably attached to an apparatus frame in at least two points, and an adjusting member provided on the apparatus frame is connected with one of the central pins at the remaining point. Still further, a plurality of edge rollers are provided on the long plates so as to be brought into contact with both lateral belt edges of two superimposed conveyor belts.

In the above-mentioned dual belt conveyor, since the central pins are rotatably attached to an apparatus frame in at least two points, and an adjusting member provided on the apparatus frame is connected with one of the central pins at the remaining point, a pair of long plates can be moved only in the lateral direction so as to travel away from each other or so as to approach each other without making relative movement in the longitudinal direction by operating an adjusting member.

Accordingly, a pair of long plates can be moved so as to travel away from each other or so as to approach each other without changing intervals between the staggered edge rollers mounted on a pair of long plates, so that edge rollers can be brought uniformly into contact with lateral belt edges of two superimposed conveyor belts.

Further, to achieve the above-mentioned first object, according to the present invention, in a dual belt conveyor being comprised of a lower horizontal part, a vertical part, and an upper horizontal part, and having two superimposed conveyor belts stretched throughout the individual parts thereof so that material to be conveyed, which is placed between two superimposed conveyor belts, is conveyed in the vertical direction. The dual belt conveyor further comprises a pair of long plates arranged against both lateral belt edges of two superimposed conveyor belts and along the direction of belt travel in the vertical part, so that both of the long plates are opposite each other, and a pantographical mechanism comprised of four link plates rotatably connected with each other, wherein one of a pair of pins connects one link plate with another link plate, disposed in the middle of the pantographical mechanism, is secured to an apparatus frame. Still further, a plurality of edge rollers are provided on the long plates so as to be brought into contact with both lateral belt edges of the two superimposed conveyor belts.

To achieve the above-mentioned second object, according to the present invention, in the above-mentioned dual belt conveyors of the first invention, the lower horizontal part and the upper horizontal part are connected with the vertical part through a looped part, respectively, and each looped part comprises four curved members which are formed according to the shape of the looped part and arranged in parallel on the outside and on the inside of the belt along the direction of belt travel. A plurality of inclined roller stands are detachably attached to two of the four above-mentioned curved members arranged on the outside of the belt, a plurality of horizontal roller stands are detachably attached to two curved members arranged on the inside of the belt, and a plurality of inclined rollers is provided, each of which is comprised of a roller body and two axes projecting from both ends of the roller body, with two chamfered parts over about the whole length of axes, in which one axis of each inclined roller is supported on each inclined roller stand, while the other axis thereof is supported on each horizontal roller stand. Further, a plurality of horizontal rollers is provided, each of which is comprised of a roller body and two axes projecting from both ends of the roller body of the horizontal roller, with two chamfered parts over about the whole length of axes, in which the axes of each horizontal roller is supported on each horizontal roller stand.

According to the second embodiment discussed above, adjustment of the edges of the rollers can be easily made while maintaining longitudinal spaces between edge roller and edge roller, and, in addition, rollers disposed on the looped part can be easily exchanged and effectively maintained.

To achieve the above-mentioned third object, according to the present invention, a dual belt conveyor is provided which is comprised of a lower horizontal part, a vertical part, and an upper horizontal part, in which the lower horizontal part and the upper horizontal part are connected with the vertical part through a looped part, respectively, and two superimposed conveyor belts are stretched throughout the individual parts thereof so that material to be conveyed, which is placed between two superimposed conveyor belts, is conveyed in the vertical direction. Each of the looped parts comprises four curved members which are formed according to the shape of the looped part and arranged in parallel on the outside and on the inside of the belt along the direction of belt travel. Further, a plurality of inclined roller stands are detachably attached to two of the four above-mentioned curved members arranged on the outside of the belt, a plurality of horizontal roller stands are detachably attached to two of the four above-mentioned curved members arranged on the inside of the belt, and a plurality of inclined rollers, each of which is comprised of a roller body and two axes projecting from both ends of the roller body, with two chamfered parts over about the whole length of axes, in which one axis of each inclined roller is supported on each inclined roller stand, while the other axis thereof is supported on each horizontal roller stand, is provided. Still further, a plurality of horizontal rollers are provided, each of which is comprised of a roller body and two axes projecting from both ends of the roller body of the horizontal roller, with two chamfered parts over about the whole length of axes, in which the axes of each horizontal roller are supported on each horizontal roller stand.

According to the third embodiment, the rollers disposed on the looped part can be easily exchanged and maintained.

BRIEF DESCRIPTION OF THE DRAWINGS

FIG. 1 is a side view of the dual belt conveyor of the present invention;

FIG. 4 is a view taken along line IV—IV of FIG. 2 illustrating the state where material to be conveyed S is conveyed on the vertical conveying part of the dual belt conveyor of the present invention;

FIG. 5 illustrates the structure of link plates mounted on long plates;

FIG. 9 is a view of the looped part taken along line IX—IX of FIG. 8;

DETAILED DESCRIPTION OF THE INVENTION

Figure 2:
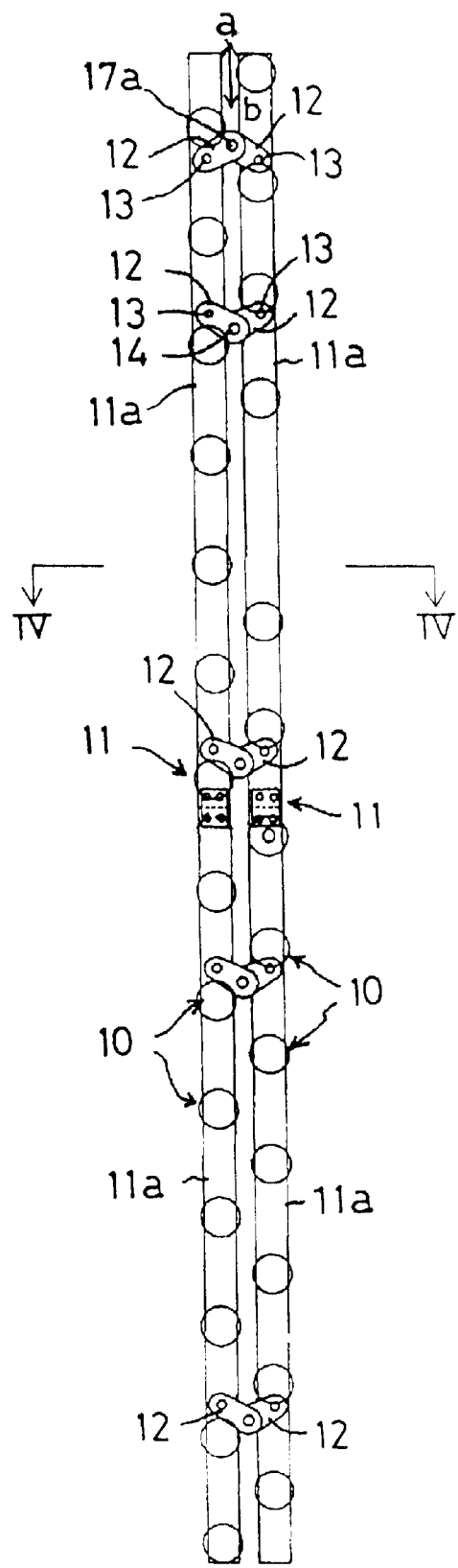
FIG. 2 is a side view illustrating the essential parts of the edge rollers mounted for conveyor belts.

In reference to the drawings, FIGS. 1–7 illustrate the preferred embodiment of the invention, in which edge rollers are mounted for two superimposed conveyor belts.

As illustrated in FIG. 1, the dual belt conveyor of the present invention is comprised of a lower horizontal conveying part 1, which is disposed at the lower part of the dual belt conveyor and receives the supply of material to be conveyed, a vertical conveying part 2, which conveys the material to be conveyed to the upper part of the dual belt conveyor, an upper horizontal conveying part 3, which is disposed at the upper part of the dual belt conveyor and discharges material sent thereto, a lower looped conveying part 4, which connects the lower horizontal conveying part 1 with the vertical conveying part 2, and an upper looped part 5 which connects the vertical horizontal part 2 with the upper horizontal conveying part 3. Supporting belt 6 and covering belt 7 are stretched from the lower horizontal conveying part 1 to the upper horizontal conveying part 3.

Supporting belt 6 and covering belt 7 are wound on pulleys 6a, 7a mounted on take-up units 8, respectively, in which a given tension is applied to supporting belt 6 and covering belt 7 by operating the take-up unit 8. Further, supporting belt 6 approaches covering belt 7, the covering belt 7 is superimposed on the supporting belt 6 in the vicinity of the lower looped conveying part 4 connecting with lower horizontal conveying part 1, and each are separated from each other in the vicinity of upper looped part 5 on the side of horizontal conveying part 3.

In the dual belt conveyor mentioned above, material to be conveyed is supplied on supporting belt 6 in lower horizontal conveying part 1, and moved with traveling supporting belt 6, and covering belt 7 is superimposed on the supporting belt 6 with material to be conveyed in the vicinity of lower looped conveying part 4 so that material to be conveyed is pushed by covering belt 7. Then, the two superimposed belts, 6, 7 travel from vertical conveying part 2 through upper looped conveying part 5 to upper horizontal conveying part 3, at which time covering belt 7 is separated from supporting belt 6, and material is discharged from an end portion of upper horizontal conveying part 3, thereby completing the conveyance of material from the lower part to the upper part of the dual belt conveyor.

Referring to FIGS. 2 to 6, the structure in which edge rollers are mounted for two superimposed conveyor belts is explained. Edge rollers 10 are arranged along the whole length of the vertical conveying part 2 on both lateral sides of the two superimposed conveyor belts 6, 7 so that the edge rollers can be brought into contact with both lateral belt edges of the two superimposed conveyor belts 6, 7. Hereinafter, the structure in which edge rollers 10 are disposed on one lateral side of belts 6, 7 shall be explained.

A pair of long plates 11 are disposed along the traveling course of superimposed conveyor belts 6, 7 in the vertical conveying part 2. In the present embodiment, long plates 11 are formed so as to have a length which corresponds to the height of the desired dual belt conveyor by interconnecting unit members 11a, each of which have a preset unit length in the longitudinal direction.

A plurality of edge rollers 10 are mounted on the respective long plates 11 at preset longitudinal intervals and so that edge rollers on one long plate and edge rollers on the other long plate are staggered. Edge rollers 10 are comprised of roller bodies 10a and axes 10b, and long plates 11 are made of members formed into channel section ( for example, channel steel). Axis 10b of edge roller 10 is attached to a flange of long plate 11. These relationships are illustrated in FIG. 4, which shows a state where material to be conveyed S is conveyed in the vertical conveying part taken along line IV—IV of FIG. 2.

Link plates 12 are rotatably attached to long plates 11 in at least three points on each long plate 11, and confront each other, in which link plate 12 attached to one long plate 11 and link plate 12 attached to the other long plate 11 are connected with each other through pins 13 as central pins. Pins 14, which act as fixed supporting points, are inserted into end portions of link plates 12 disposed at two points out of the above-mentioned three points on each long plate 11, and the pin 14 is secured to bracket 16 fixed to apparatus frame 15 (refer to FIG. 5).

Further, an adjusting member 17 is connected with link plate 12 at the remaining point on each long plate 11. Adjusting member 17 functions in the turning of link plates 12 so as to make a pair of long plates travel away from each other or approach each other, and maintains the desired positions of long plates 11. When adjusting member 17 performs the above-mentioned functions, the adjusting member 17 is not restricted to a specific structure.

Figure 3:
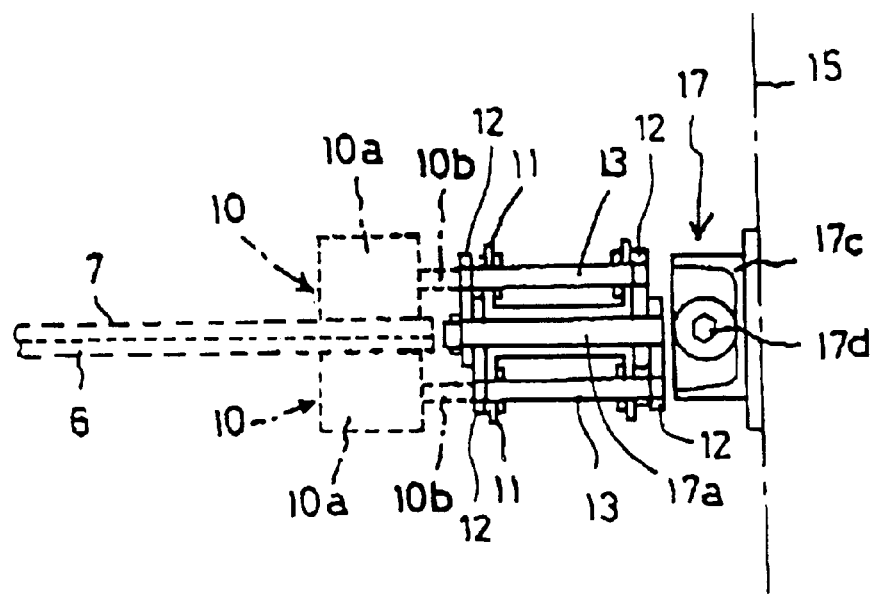
FIG. 3a is a transverse sectional view of the structure of an adjusting member of the present invention.
FIG. 3(b) is a side view of adjusting member, as shown in FIG. 3(a)
Figure 3:
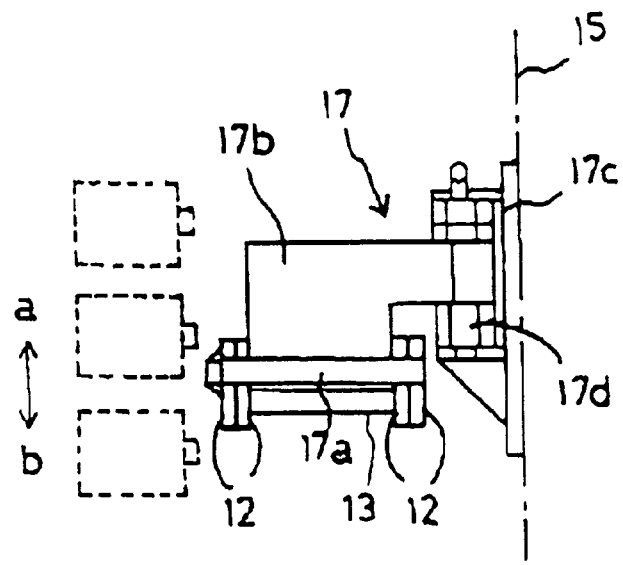

In this embodiment, as shown in FIGS. 3(*a*), and (*b*), adjusting member 17 is comprised of pin 17*a* which is inserted into one end of link plate 12, nut member 17*b* having a female screw portion at a given position, the nut member 17*b* being fixed to pin 17*a*, screw bar 17*d* screwed into female screw portion of nut member 17*b* and rotatably attached to bracket 17*c* which is fixed to apparatus frame 15.

In the above-mentioned adjusting member 17, as screw bar 17*d* is rotated, nut member 17*b* is moved in the direction of the arrow a or b shown in FIGS. 2 and 3(*b*), according to the direction of rotation. When nut member 17*b* is moved parallel to the traveling direction of each belt 6, 7, since pins 14 secured to apparatus frame 15 are inserted into ends of link plates 12 at two other points, the distance between pins 14 secured to apparatus frame 15 and pin 17*a* of adjusting member 17 changes, so that together with the movement of nut member 17*b*, link plates 12 are turned, while a pair of long plates 11 are moved so as to travel away from each other or so as to approach each other.

Figure 6:
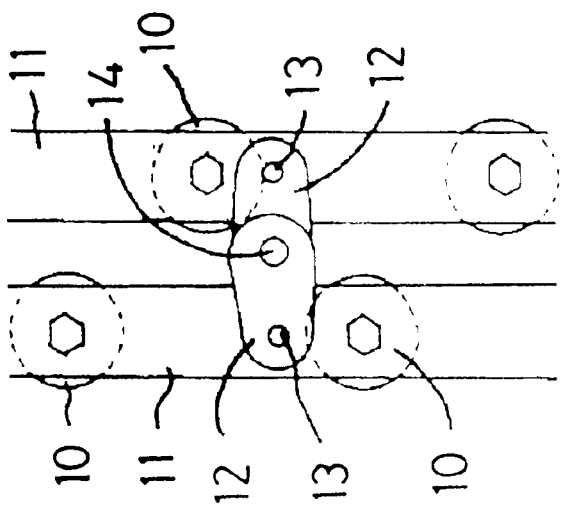
FIGS. 6(a), (b), (c) are partial side views of the dual belt conveyor of the present invention illustrating the change in longitudinal spaces between edge rollers when the long plates are moved so as to travel away from each other or when long plates are moved so as to approach each other.
Figure 6:
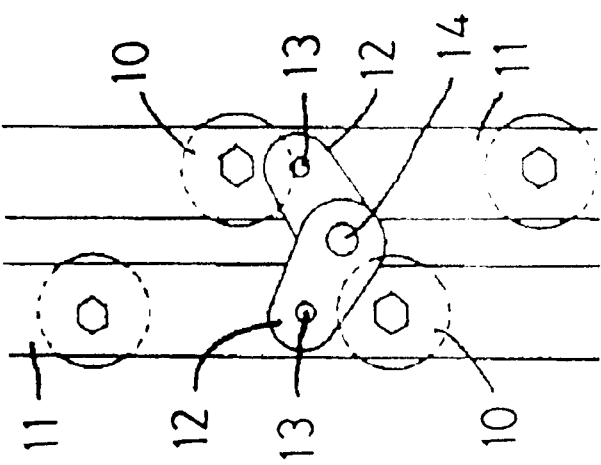
Figure 6:
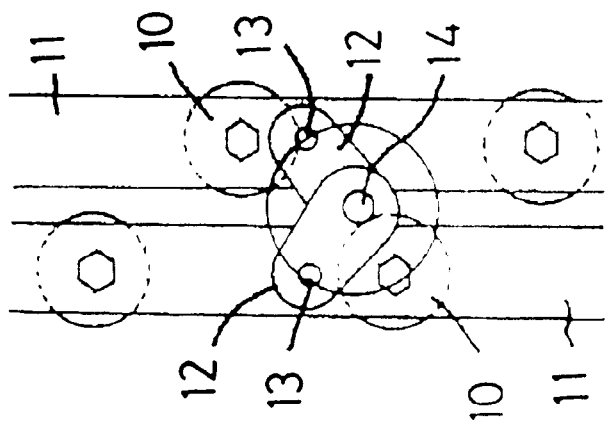

In the structure in which edge rollers are mounted for two superimposed conveyor belts, as mentioned above, for example, when each belt 6, 7 is worn out and exchanged for new belts, it is preferable to keep a pair of long plates 11 as far apart from each other as possible, as shown in FIG. 6(*c*). In such a case, by moving nut member 17*b* in the direction of the arrow a, it is possible to keep a pair of long plates 11 apart from each other.

Further, in the case where used belts 6, 7 are exchanged for new belts, and thereafter new belts are brought into contact with edge rollers 10, with changing a space between a pair of long plates from the state shown in FIG. 6(*c*) to the state shown in FIG. 6(*b*), or in the case where as belts 6, 7 are worn but exchange of belts is not yet needed, adjustment of the state of edge rollers being brought into contact with belts 6, 7 can be made as shown in FIG. 6(*a*), so that a pair of long plates 11 can be moved so as to approach each other by moving nut member 17*b* in the direction of the arrow a.

In particular, in the case where a pair of long plates 11 are moved so as to travel away from each other or so as to approach each other, because of these long plates 11 being turned on pin 14 secured to apparatus frame 15 as a supporting point, relative distances between edge rollers 10 mounted on individual long plates are constant. Accordingly, even if a pair of long plates 11 are moved so as to travel away from each other or so as to approach each other, intervals between staggered edge rollers remain constant.

Figure 7:
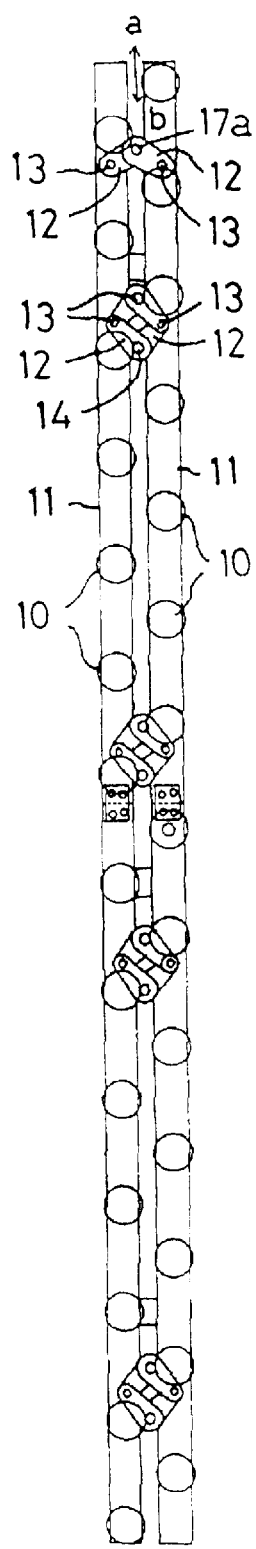
FIG. 7 is a side view illustrating the structure of link plates.
Figure 8:
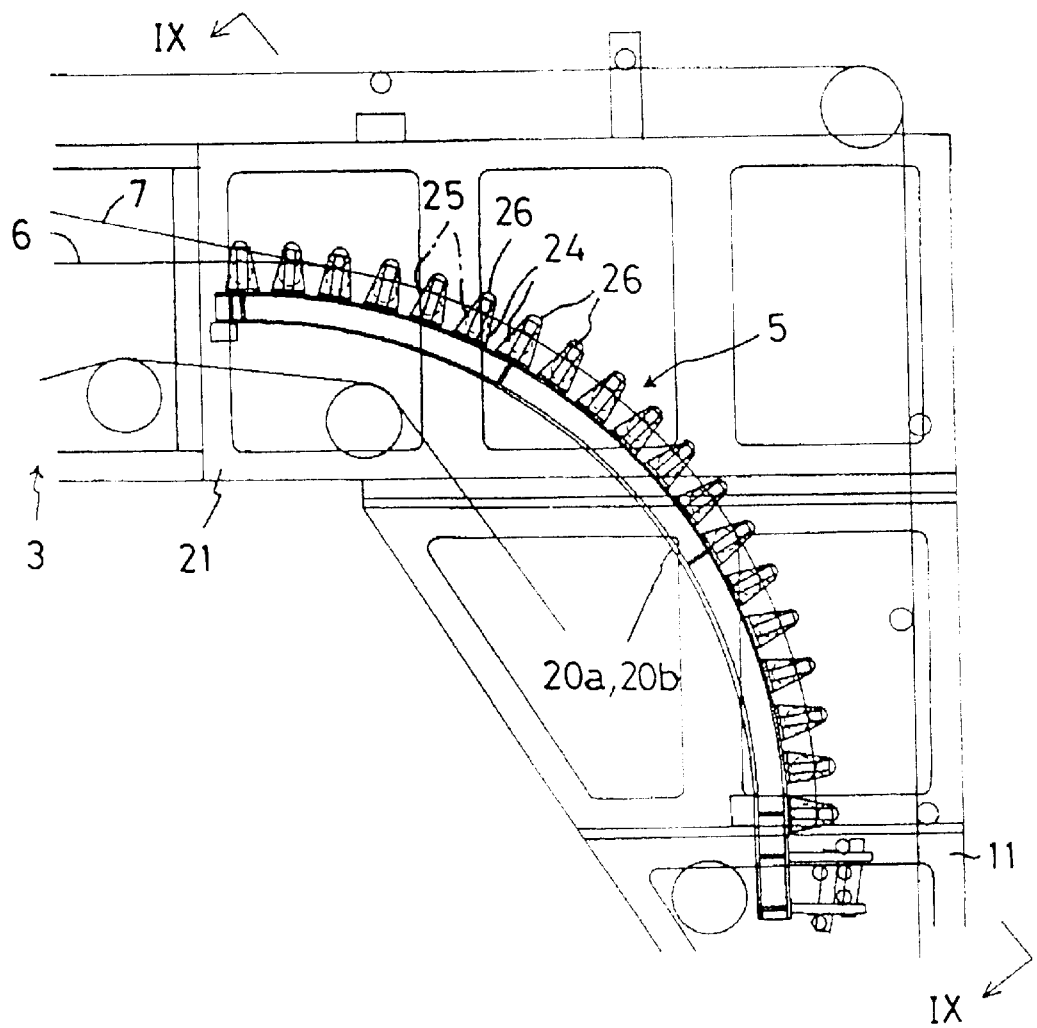
FIG. 8 is a partial side view of the dual belt conveyor of the present invention showing the structure of the looped part.

FIG. 7 shows another variation of the first embodiment of the present invention, in which pairs of link plates 12 are mounted rotatably on long plates 11 in at least two points on long plates 11 in such a manner that two link plates 12 can be turned when a pair of long plates 11 are moved so as to travel away from each other or so as to approach each other, and in which pin 14 fixed to apparatus frame 15 is inserted into one of each pair of link plates 12 mounted on each long plate, while the other of the pair of link plates 12 mounted on one long plate is connected with the other link plate out of each pair of link plates 12 mounted on the other long plate 12 through pin 13. Namely, a pair of long plates 11 are connected with each other through pantographic mechanisms composed of four link plates 12.

Even in the case where long plates 11 are connected with each other through pantographic mechanisms, by operating adjusting member 17, the long plates can be moved so as to travel away from each other or so as to approach each other.

The structure of the looped part according to the present invention is illustrated in FIGS. 8 to 11 herein. Since lower looped part 4 and upper looped part 5 are basically of the same construction, the structure of upper looped part 5 is explained representatively.

In upper looped part 5, superimposed supporting belts 6 and covering belt 7 are moved with curving at 90° with a preset radius so that these belts 6, 7 can be moved smoothly from the vertical part 2 to the upper horizontal part 3.

Two curved members 20*a* and two curved members 20*b* formed into a circular shape of ¼ circle with a radius corresponding to the radius of looped part 5 are disposed inside and outside of upper looped part 5 and parallel to each other, and secured to apparatus frame 21, respectively. Connecting members 22 are disposed so as to cross individual curved members 20*a*, 20*b* so that four curved members 20*a*, 20*b* are connected with each other through the connecting members 22 in such a manner that lateral movements of four curved members 20*a*, 20*b* can be prevented.

Figure 11:
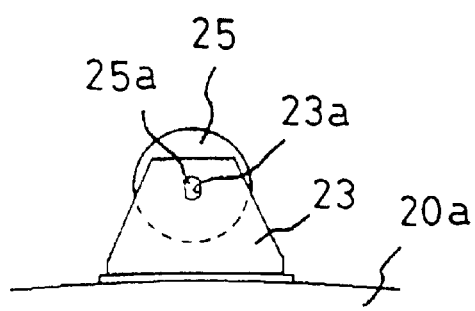
FIG. 11 is a side view of the horizontal roller stand and inclined roller stand of the present invention.
Figure 11:
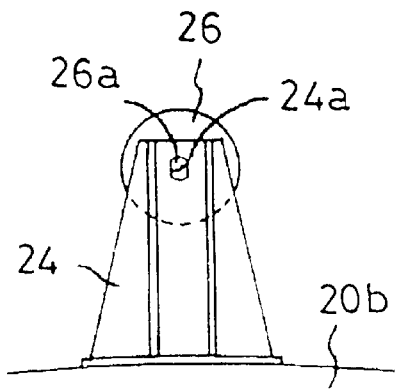

Horizontal roller stand 23 shown in FIG. 11(*a*) is detachably attached to two curved members 20*a* disposed inside of upper looped part 5. Inclined roller stand 24 shown in FIG. 11(*b*) is detachably attached to two curved members 20*b* disposed outside of upper looped part 5, and opposed to horizontal roller stand 23. Namely, four roller stands 23, 24 are attached, independently and detachably, to curved members 20*a*, 20*b*, in a straight line in the direction in which four roller stands 23, 24 cross curved members 20*a*, 20*b*, respectively. Further, a plurality of roller stands 23, 24 are disposed at preset intervals on curved members 20*a*, 20*b*.

Figure 10:
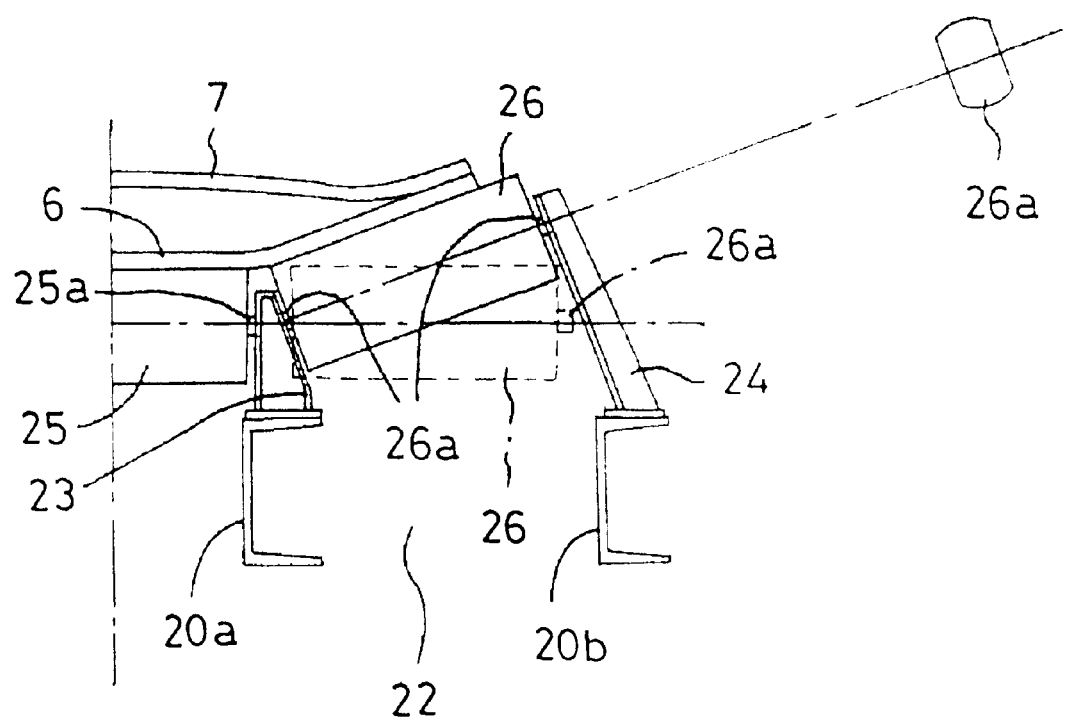
FIG. 10 is a semi sectional view of the looped part taken along line X—X of FIG. 9.

Horizontal roller stands 23 support horizontal rollers 25 disposed inside, and support inclined rollers 26 disposed outside together with inclined roller stands 24. Individual rollers 25, 26, being roller bodies, have axes 25*a*, 26*a* projected from both ends of the rollers 25, 26 in the axial direction, axes 25*a*, 26*a* having two chamfered parts formed over the whole length thereof, respectively (FIG. 10). Therefore, holes which are engaged with two chamfered parts of axes 25*a*, 26*b* of individual roller 25, 26 are formed in the inside and outside of roller stands 23 and in the inside of inclined roller stands 24.

Namely, each individual roller stand 23, 24 has hole 23*a*, 24*a*, respectively, with nearly the same shape as that of section of axis 25*a*, 26*a*. Each roller stand 23, 24 is moved so that the center of each hole 23*a*, 24*b* coincides with the center of each axis 25*a*, 26*a*, respectively, and engages with the axis 23*a*, 24*b*, respectively, so that each individual roller 25, 26 can be supported by individual roller stand 23, 24, respectively. In this case, holes of roller stand are not necessarily needed for supporting axis 25*a*, 26*a*. It is a matter of course that a groove having a shape corresponding to the flat faces of two chamfered parts can be formed in the roller stands.

In the upper looped part 5 mentioned above, a load corresponding to the amount of tension acts on superimposed supporting belt 6 and covering belt 7 on horizontal rollers 25 and inclined rollers 26. This load is transmitted through roller stands 23, inclined roller stands 24 and curved members 20*a*, 20*b* to apparatus frame 21, respectively. For this reason, unlike in the prior art where a pair of roller stands (corresponding to horizontal roller stands 23) are disposed inside as carrier rollers, curved members 20a, 20b have high enough rigidity to prevent vibration generated during traveling of the belts, thereby permitting quiet running of the apparatus.

In the situation where any of rollers 25, 26 is worn, and exchange of a worn roller for a new roller is needed, inclined roller stand 24 attached to outer curved member 20b is removed. In this case, bolts which fix inclined roller stand 24 are removed, and then the inclined roller stand can be removed by drawing the inclined roller stand along the axis 26a of inclined roller 26. Namely, the inclined roller stand 24 can be removed without raising axis 26a of inclined roller 26 above the height of inclined roller stand 24.

Inclined roller 26 can be removed from horizontal roller stand 23 by removing inclined roller stand 24 from curved member 20b, and thereafter drawing inclined roller 26 in the axial direction. Further, horizontal roller 25 can be removed by removing horizontal roller stand 23 from curved member 20a in the same manner as in inclined roller stand 24.

Further, when it is necessary to install a new horizontal roller 25 and a inclined roller 26, they can be easily installed by reversing the procedure outlined above. Therefore, without loading superimposed conveyor belts in such a manner that superimposed supporting belt 6 and covering belt 7 are kept away from horizontal roller 25 and inclined roller 26, routine maintenance and exchange of each roller 25, 26 is greatly simplified.

Further, since four curved members 20a–20b are disposed in looped part 5, high rigidity is obtained. Therefore, vibration generated during traveling of the belts can be prevented, thereby permitting quiet running of the dual belt conveyor.

As mentioned in detail above, with the dual belt conveyor with edge rollers being mounted on long plates according to the present invention, the state of the edge rollers being brought into contact with both lateral belt edges can be adjusted by moving a pair of long plates away from or toward each other by operation of an adjusting member. Therefore, adjusting the state of edge rollers being brought into contact with belts when belts become worn or need to be replaced is quick and easy, when using the present invention.

Particularly, when a pair of long plates are moved away or toward each other, intervals between staggered edge rollers mounted on long plates remain constant. Therefore, superimposed conveyor belts can be brought uniformly into contact with edge rollers.

Further, in a dual belt conveyor having the abovementioned looped part, when the horizontal rollers and inclined rollers are worn out, exchange of used horizontal rollers and inclined rollers for new horizontal rollers and inclined rollers can be easily made, thereby improving the efficiency of maintenance.

What is claimed is:

1. A dual belt conveyor comprising a lower horizontal part, a vertical part, and an upper horizontal part, and having two superimposed conveyor belts stretched throughout individual parts thereof so that material to be conveyed, which is placed between the two superimposed conveyor belts, is conveyed in a vertical direction, wherein the dual belt conveyor further comprises a pair of long plates arranged against both lateral belt edges of said two superimposed conveyor belts, along the direction of belt travel in said vertical part, the long plates being positioned opposite each other, and two link plates rotatably attached to the long plates on one side of each link plate, one link plate being connected to the other link plate through a central pin located on a side of each link plate opposite the long plate, further wherein a pair of said long plates are engaged with each other through the link plates in at least three points, the central pins are rotatably attached to an apparatus frame in at least two points, and an adjusting member provided on the apparatus frame is connected with one of the central pins at a single point other than the two points where the central pins are rotatable attached to the apparatus frame and, further, a plurality of edge rollers being provided on the long plates so as to be brought into contact with both lateral belt edges of two superimposed conveyor belts.

2. A dual belt conveyor comprising a lower horizontal part, a vertical part, and an upper horizontal part, and having two superimposed conveyor belts stretched throughout individual parts thereof so that material to be conveyed, which is placed between two superimposed conveyor belts, is conveyed in a vertical direction, wherein the dual belt conveyor comprises a pair of long plates arranged against both lateral belt edges of said two superimposed conveyor belts, along the direction of belt travel in the vertical part, the long plates being positioned opposite each other, and a pantographical mechanism comprised of four link plates rotatably connected with each other, wherein one of a pair of pins for connecting one link plate with another link plate, disposed in the middle of the pantographical mechanisms, is secured to an apparatus frame, and furthers, a plurality of edge rollers being provided on the long plates so as to be brought into contact with both lateral belt edges of said two superimposed conveyor belts.

3. The dual belt conveyor of claim 1, wherein the lower horizontal part and the upper horizontal part are connected with the vertical part through a looped part, respectively, each looped part comprising four curved members formed according to the shape of the looped part and arranged in parallel outside and inside of the belt along the direction of belt travel, a plurality of inclined roller stands being detachably attached to two of said four curved members arranged outside of the belt, a plurality of horizontal roller stands detachably attached to two of said four curved members arranged inside of the belt, a plurality of inclined rollers, each inclined roller comprising a roller body and two axes projecting from both ends of the roller body, with two chamfered parts over about the whole length of axes, in which one axis of each inclined roller is supported on each inclined roller stand, while the other axis thereof is supported on each horizontal roller stand, and a plurality of horizontal rollers, each horizontal roller comprising a roller body and two axes projecting from both ends of the roller body of horizontal roller, with two chamfered parts over about the whole length of axes, in which the axes of each horizontal roller are supported on each horizontal roller stand.

4. A dual belt conveyor comprising a lower horizontal part, a vertical part, and an upper horizontal part, in which the lower horizontal part and the upper horizontal part are connected with the vertical part through a looped part, respectively, and having two superimposed conveyor belts stretched throughout individual parts thereof so that material to be conveyed, which is placed between said two superimposed conveyor belts, is conveyed in the vertical direction, wherein each of the looped parts comprises four curved members which are formed according to the shape of the looped part and arranged in parallel outside and inside of the belt along the direction of belt travel, a plurality of inclined roller stands being detachably attached to two of said four curved members arranged on the outside of the belt, a plurality of horizontal roller stands detachably attached to two of said four curved members arranged on the inside of the belt, a plurality of inclined rollers, each inclined roller comprising a roller body and two axes projecting from both ends of the roller body, with two chamfered parts over about the whole length of axes, in which one axis of each inclined roller is supported on each inclined roller stand, while the other axis thereof is supported on each horizontal roller stand, and a plurality of horizontal rollers, each horizontal roller comprising a roller body and two axes projecting from both ends of the roller body of said horizontal roller, with two chamfered parts over about the whole length of axis, in which the axes of each horizontal roller are supported on each horizontal roller stand.

5. The dual belt conveyor of claim 2, wherein the lower horizontal part and the upper horizontal part are connected with the vertical part through a looped part, respectively, and each looped part comprises four curved members which are formed according to the shape of the looped part and arranged in parallel on outside and on inside of belt along the direction of belt travel, a plurality of inclined roller stands which are detachably attached to two of the four curved members arranged outside of the belt, a plurality of horizontal roller stands detachably attached to two of the four curved members arranged inside of the belt, a plurality of inclined rollers, each inclined roller comprising a roller body and two axes projecting from both ends of the roller body, with two chamfered parts over about the whole length of axes, in which one axis of each inclined roller is supported on each inclined roller stand, while the other axis thereof is supported on each horizontal roller stand, and a plurality of horizontal rollers, each horizontal roller comprising a roller body and two axes projecting from both ends of the roller body of horizontal roller, with two chamfered parts over about the whole length of axes, in which the axes of each horizontal roller are supported on each horizontal roller stand.

* * * * *